(12) United States Patent
Chang (10) Patent No.: US 10,648,576 B1
(45) Date of Patent: May 12, 2020

(54) WATER VALVE

(71) Applicant: Chia-Po Chang, Changhua (TW)

(72) Inventor: Chia-Po Chang, Changhua (TW)

(73) Assignee: HAIN YO ENTERPRISES CO., LTD., Changhua (TW)

( * ) Notice: Subject to any disclaimer, the term of this patent is extended or adjusted under 35 U.S.C. 154(b) by 25 days.

(21) Appl. No.: 16/172,802

(22) Filed: Oct. 28, 2018

(51) Int. Cl.
| | | |
|---|---|---|
| *F16K 11/074* | (2006.01) | |
| *F16K 11/044* | (2006.01) | |
| *F16K 1/36* | (2006.01) | |
| *F16K 11/078* | (2006.01) | |
| *F16K 11/00* | (2006.01) | |
| *F16K 27/02* | (2006.01) | |

(52) U.S. Cl.
CPC .............. *F16K 11/044* (2013.01); *F16K 1/36* (2013.01); *F16K 11/0787* (2013.01); *F16K 19/006* (2013.01); *F16K 27/0263* (2013.01); *F16K 11/074* (2013.01); *Y10T 137/86863* (2015.04)

(58) Field of Classification Search
CPC ..... Y10T 137/86831; Y10T 137/86823; Y10T 137/86815; F16K 11/0743; G05D 23/1313
See application file for complete search history.

(56) References Cited

U.S. PATENT DOCUMENTS

| | | | | |
|---|---|---|---|---|
| 5,896,601 A * | 4/1999 | Humpert | .............. | F16K 11/0787 4/676 |
| 6,123,105 A * | 9/2000 | Yang | ................... | F16K 11/0743 137/270 |
| 6,640,357 B1 * | 11/2003 | Chang | ..................... | E03C 1/042 137/360 |
| 6,805,151 B1 * | 10/2004 | Chang | ................. | F16K 11/0743 137/270 |
| 6,845,917 B1 * | 1/2005 | Chen | ................... | F16K 11/0787 137/625.28 |
| 7,806,134 B1 * | 10/2010 | Chang | ................ | G05D 23/1313 137/100 |
| 7,918,241 B1 * | 4/2011 | Chang | ..................... | F16K 11/074 137/315.09 |
| 8,109,292 B2 * | 2/2012 | Bolgar | ................ | F16K 11/0787 137/597 |
| 8,985,148 B2 * | 3/2015 | Chang | ................... | F16K 11/076 137/597 |
| 9,644,353 B1 * | 5/2017 | Chang | .................... | E03C 1/0404 |
| 9,772,631 B1 * | 9/2017 | Chang | ................... | F16K 11/105 |
| 2004/0187938 A1 * | 9/2004 | Yang | ................... | F16K 11/0746 137/625.41 |

(Continued)

*Primary Examiner* — Robert K Arundale
(74) *Attorney, Agent, or Firm* — Che-Yang Chen; Law Office of Michael Chen (57) ABSTRACT

A water valve may comprise a valve shell, and a rotating base is installed in the valve shell. A lower end of the rotating base is sequentially connected to a driving valve piece and a fixed valve piece which are installed in the valve shell. A center of a top portion of the rotating base comprises a valve rod upwardly protruding out of the valve shell. The rotating base is configured to engage with the driving valve piece, and through operating the valve rod, the rotating base driven by the valve rod is adapted to drive and have synchronous rotation with the driving valve piece so as to change the relative positions between the driving valve piece and the fixed valve piece and then to control on/off operation of a faucet, ratio of hot and cold water and the amount of water flow.

7 Claims, 12 Drawing Sheets

(56) References Cited

U.S. PATENT DOCUMENTS

| | | | |
|---|---|---|---|
| 2005/0022886 A1* | 2/2005 | Lin | F16K 11/0743 137/625.41 |
| 2006/0037651 A1* | 2/2006 | Yang | F16K 11/0743 137/625.41 |
| 2006/0042705 A1* | 3/2006 | Chang | F16K 11/0743 137/637.3 |
| 2006/0162793 A1* | 7/2006 | Di Nunzio | F16K 11/0787 137/625.46 |
| 2008/0164330 A1* | 7/2008 | Wei | F16K 11/0743 236/12.1 |
| 2009/0071559 A1* | 3/2009 | Peng | F16K 11/0787 137/625.46 |
| 2009/0205717 A1* | 8/2009 | Yuan | F16K 11/0743 137/100 |
| 2010/0006169 A1* | 1/2010 | Bolgar | F16K 11/0743 137/898 |
| 2013/0098474 A1* | 4/2013 | Tung | G05D 23/1313 137/98 |
| 2013/0199632 A1* | 8/2013 | Law | F16K 11/044 137/511 |
| 2014/0097256 A1* | 4/2014 | Yang | F16K 11/0743 236/12.2 |
| 2014/0238517 A1* | 8/2014 | Chen | F16K 35/04 137/605 |
| 2014/0345730 A1* | 11/2014 | Chang | F16K 11/18 137/625.17 |
| 2015/0144214 A1* | 5/2015 | Chang | F16K 11/02 137/625.41 |
| 2017/0108127 A1* | 4/2017 | Chang | F16K 11/0746 |
| 2017/0114909 A1* | 4/2017 | Chang | F16K 11/074 |
| 2017/0350518 A1* | 12/2017 | Chang | F16K 11/085 |
| 2018/0135765 A1* | 5/2018 | Kim | F16K 11/0743 |
| 2018/0275695 A1* | 9/2018 | Chang | F16K 11/00 |
| 2019/0323615 A1* | 10/2019 | Chen | F16K 35/04 |

\* cited by examiner

WATER VALVE

FIELD OF THE INVENTION

The present invention relates to a valve, and more particularly to a water valve that can be used for switching two water sources.

BACKGROUND OF THE INVENTION

Water equipment is usually available for cold water and hot water, and warm water is also provided by mixing cold water and hot water. The ratio of mixing cold water and hot water is always adjustable by a user such that the user can have warm water in different temperatures he/she needs. The mixing control of cold water and hot water is mainly accomplished through the rotation of a water control valve.

However, the conventional water valve is disadvantageous because: the conventional water control valve usually can only connect to one water source. Thus, when the cold water and hot water are needed simultaneously, it is necessary to install a water divider between pipes of the water control valves, the cold water source and the hot water source, or a user needs to additionally install a pulling handle on the water control valve. As a result, it will greatly increase the complexity of the whole water pipeline, and also when water is needed, the user has to operate between the two water control valves and water divider, which leads to inconvenience in use of water equipment. Therefore, there remains a need for a new and improved design for a water valve to overcome the problems presented above.

SUMMARY OF THE INVENTION

The present invention provides a water valve which comprises a valve shell, and a rotating base is installed in the valve shell. A lower end of the rotating base is sequentially connected to a driving valve piece and a fixed valve piece, and the driving valve piece and the fixed valve piece are installed in the valve shell. A center of a top portion of the rotating base comprises a valve rod upwardly protruding out of the valve shell. The rotating base is configured to engage with the driving valve piece, and through operating the valve rod, the rotating base driven by the valve rod is adapted to drive and have synchronous rotation with the driving valve piece so as to change the relative positions between the driving valve piece and the fixed valve piece and then to control on/off operation of a faucet, ratio of hot water and cold water and the amount of water flow. A base is coupled with and block a bottom portion of the valve shell, thereby securing the fixed valve piece, the driving valve piece, and the rotating base in the valve shell. The base comprises a water inlet chamber, and a balanced valve is installed therein. When in use, the water valve of the present invention is positioned into a valve chamber of a shunt valve, and the shunt valve comprises a second cold water inlet, a second hot water inlet, a first water channel and a second water channel respectively penetrating through a bottom portion of the valve chamber. The second cold water inlet and the second hot water inlet are respectively connected to cold water source and hot water source, and the first water channel and the second water channel are respectively connected to two water equipments, such that through operating the water valve of the present invention, cold water, hot water, or warm water mixed from cold water and hot water is configured to flow through one of the water equipments.

The valve shell comprises a housing, and an upper portion of housing is connected to a ring portion which has a first opening at a central portion thereof, and a diameter of the ring portion is smaller than the housing. The rotating base, the driving valve piece, the fixed valve piece are positioned in the housing of the valve shell, and the valve rod is configured to upwardly protrude out of the valve shell through the first opening. An inner surface of the ring portion comprises two protruding blocks, and a concaved locating portion is formed on the inner surface of the ring portion at a rotating path of the two protruding blocks. Also, a locating piece is upwardly extended from an edge of the first opening. A central portion of the rotating base is connected to the valve rod, and a first driving block having an arc-edge protrudes from an edge of the rotating base, and two blocking walls are respectively formed at two lateral sides of the first driving block. Moreover, a slot is formed on an upper surface of the first driving block, and a spring is installed therein. Also, a locating bolt is downwardly coupled with the slot to bear against the spring such that the spring is configured to keep pushing the locating bolt upwardly. A first teeth portion is formed at an outer periphery of the valve rod, and the first teeth portion has two limiting pieces. Each of the limiting pieces has a second opening at a central portion thereof, and a second teeth portion is formed at an inner periphery of the second opening. The limiting pieces are disposed and engaged with the valve rod through engaging the second teeth portions with the first teeth portion. Each of the limiting pieces comprises a blocking portion, and the limiting pieces are configured to be pulled out from and re-engaged with the valve rod to adjust the separated angle between the two blocking portions, thereby adjusting of temperature limit angle of the water valve. A bottom portion of the driving valve piece comprises a concave portion to form a mixing chamber, and the mixing chamber is expanded from one side thereof to increase the area of the mixing chamber. The fixed valve piece comprises an arc-shaped cold water hole and an arc-shaped hot water hole respectively and vertically penetrating through the fixed valve piece, and the cold water hole and the hot water hole are formed symmetrically on the fixed valve piece. A first water outlet hole and a second water outlet hole respectively and vertically penetrate through the fixed valve piece between the cold water hole and the hot water hole, and the first water outlet hole and the second water outlet hole are spaced apart toward opposed sides of the fixed valve piece. The base has a water inlet chamber and a water outlet chamber formed therein, and the water inlet chamber and the water outlet chamber are formed separately. A first cold water inlet and a first hot water inlet, which are formed separately, are connected at an upper end of the water inlet chamber and vertically penetrate the base. Two water outlet chambers are formed at two sides of the water inlet chamber, and the two water outlet chambers are respectively connected to a first drain and a second drain at upper ends thereof, and the first drain and the second drain respectively vertically penetrate through the base. The rotating base, the driving valve piece and the fixed valve piece in the housing are stacked in sequence, and the base is connected to the valve shell, the rotating base, the driving valve piece and the fixed valve piece are secured in the housing, and the fixed valve piece is engaged with an upper portion of the base. Also, the first cold water inlet, the first hot water inlet, the first drain, and the second drain of the base are respectively aligned with the cold water hole, the hot water hole, the first water outlet hole, and the second water outlet hole of the fixed valve piece. Before the valve rod is operated, the mixing chamber of the driving valve piece is misaligned with the hot water hole, the first water outlet hole, and the second water outlet hole of the fixed valve piece such that cold water and hot water are blocked by the driving valve piece and not flow out from the shunt valve. When the water valve of the present invention is positioned into the valve chamber of the shunt valve, the second cold water inlet, the second hot water inlet, the first water channel, and the second water channel of the shunt valve are configured to directly or indirectly communicate with the first cold water inlet, the first hot water inlet, the first drain, the second drain of the base respectively.

Comparing with conventional water valve, the present invention is advantageous because: (i) the water valve of the present invention can control two water equipments in mixing cold water and hot water without installing a water divider between pipes of the water valve or a pulling handle, which simplifies the whole water pipeline and eliminate risk of touching the pulling handle by mistake when in use; (ii) a user can operate single handle of the water valve toward two opposed directions to control two water equipments for use of water, which saves labor and time; and (iii) the cooperation between the protruding blocks, the first driving block, the locating piece, and the limiting pieces can prevent the water valve from being over-rotated or prevent a user from burns due to hot water draining out instantly, thereby achieving multiple protective effects.

DETAILED DESCRIPTION OF THE INVENTION

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a water valve which comprises a valve shell (10), and a rotating base (20) is installed in the valve shell (10). A lower end of the rotating base (20) is sequentially connected to a driving valve piece (30) and a fixed valve piece (40), and the driving valve piece (30) and the fixed valve piece (40) are installed in the valve shell (10). A center of a top portion of the rotating base (20) comprises a valve rod (21) upwardly protruding out of the valve shell (10). The rotating base (20) is configured to engage with the driving valve piece (30), and through operating the valve rod (21), the rotating base (20) driven by the valve rod (21) is adapted to drive and have synchronous rotation with the driving valve piece (30) so as to change the relative positions between the driving valve piece (30) and the fixed valve piece (40) and then to control on/off operation of a faucet, ratio of hot water and cold water and the amount of water flow. A base (50) is coupled with and block a bottom portion of the valve shell (10), thereby securing the fixed valve piece (40), the driving valve piece (30) and the rotating base (20) in the valve shell (10). The base (50) comprises a water inlet chamber (51), and a balanced valve (60) is installed therein. When in use, the water valve of the present invention is positioned into a valve chamber (71) of a shunt valve (70), and the shunt valve (70) comprises a second cold water inlet (72), a second hot water inlet (73), a first water channel (74) and a second water channel (75) respectively penetrating through a bottom portion of the valve chamber (71). The second cold water inlet (72) and the second hot water inlet (73) are respectively connected to cold water source and hot water source, and the first water channel (74) and the second water channel (75) are respectively connected to two water equipments, such that through operating the water valve of the present invention, cold water, hot water, or warm water mixed from cold water and hot water is configured to flow through one of the water equipments.

The valve shell (10) comprises a housing (11), and an upper portion of housing (11) is connected to a ring portion (12) which has a first opening (13) at a central portion thereof, and a diameter of the ring portion (12) is smaller than the housing (11). The rotating base (20), the driving valve piece (30), the fixed valve piece (40) are positioned in the housing (11) of the valve shell (10), and the valve rod (21) is configured to upwardly protrude out of the valve shell (10) through the first opening (13). An inner surface of the ring portion (12) comprises two protruding blocks (14), and a concaved locating portion (15) is formed on the inner surface of the ring portion (12) at a rotating path of the two protruding blocks (14). Also, a locating piece (16) is upwardly extended from an edge of the first opening (13). A central portion of the rotating base (20) is connected to the valve rod (21), and a first driving block (201) having an arc-edge protrudes from an edge of the rotating base (20), and two blocking walls (202) are respectively formed at two lateral sides of the first driving block (201). Moreover, a slot is formed on an upper surface of the first driving block (201), and a spring (22) is installed therein. Also, a locating bolt (23) is downwardly coupled with the slot to bear against the spring (22) such that the spring (22) is configured to keep pushing the locating bolt (23) upwardly. A first teeth portion (211) is formed at an outer periphery of the valve rod (21), and the first teeth portion (211) has two limiting pieces (24). Each of the limiting pieces (24) has a second opening at a central portion thereof, and a second teeth portion (241) is formed at an inner periphery of the second opening. The limiting pieces (24) are disposed and engaged with the valve rod (21) through engaging the second teeth portions (241) with the first teeth portion (211). Each of the limiting pieces (24) comprises a blocking portion, and the limiting pieces (24) are configured to be pulled out from and re-engaged with the valve rod (21) to adjust the separated angle between the two blocking portions, thereby adjusting of temperature limit angle of the water valve. A bottom portion of the driving valve piece (30) comprises a concave portion to form a mixing chamber (31), and the mixing chamber (31) is expanded from one side thereof to increase the area of the mixing chamber (31). The fixed valve piece (40) comprises an arc-shaped cold water hole (41) and an arc-shaped hot water hole (42) respectively and vertically penetrating through the fixed valve piece (40), and the cold water hole (41) and the hot water hole (42) are formed symmetrically on the fixed valve piece (40). A first water outlet hole (43) and a second water outlet hole (44) respectively and vertically penetrate through the fixed valve piece (40) between the cold water hole (41) and the hot water hole (42), and the first water outlet hole (43) and the second water outlet hole (44) are spaced apart toward opposed sides of the fixed valve piece (40). The base (50) has a water inlet chamber (51) and a water outlet chamber (52) formed therein, and the water inlet chamber (51) and the water outlet chamber (52) are formed separately. A first cold water inlet (53) and a first hot water inlet (54), which are formed separately, are connected at an upper end of the water inlet chamber (51) and vertically penetrate the base (50). Two water outlet chambers (52) are formed at two sides of the water inlet chamber (51), and the two water outlet chambers (52) are respectively connected to a first drain (55) and a second drain (56) at upper ends thereof, and the first drain (55) and the second drain (56) respectively vertically penetrate through the base (50). The rotating base (20), the driving valve piece (30) and the fixed valve piece (40) in the housing (11) are stacked in sequence, and the base (50) is connected to the valve shell (10), the rotating base (20), the driving valve piece (30) and the fixed valve piece (40) are secured in the housing (11), and the fixed valve piece (40) is engaged with an upper portion of the base (50). Also, the first cold water inlet (53), the first hot water inlet (54), the first drain (55), and the second drain (56) of the base (50) are respectively aligned with the cold water hole (41), the hot water hole (42), the first water outlet hole (43), and the second water outlet hole (44) of the fixed valve piece (40). Before the valve rod (21) is operated, the mixing chamber (31) of the driving valve piece (30) is misaligned with the hot water hole (42), the first water outlet hole (43), and the second water outlet hole (44) of the fixed valve piece (40) such that cold water and hot water are blocked by the driving valve piece (30) and not flow out from the shunt valve (70). When the water valve of the present invention is positioned into the valve chamber (71) of the shunt valve (70), the second cold water inlet (72), the second hot water inlet (73), the first water channel (74), and the second water channel (75) of the shunt valve (70) are configured to directly or indirectly communicate with the first cold water inlet (53), the first hot water inlet (54), the first drain (55), the second drain (56) of the base (50) respectively. (Because the first cold water inlet (53) and the first hot water inlet (54) are indirectly communicated through the balanced valve (60), and the second cold water inlet (72) and the second hot water inlet (73) of the shunt valve (70).

Figure 1:
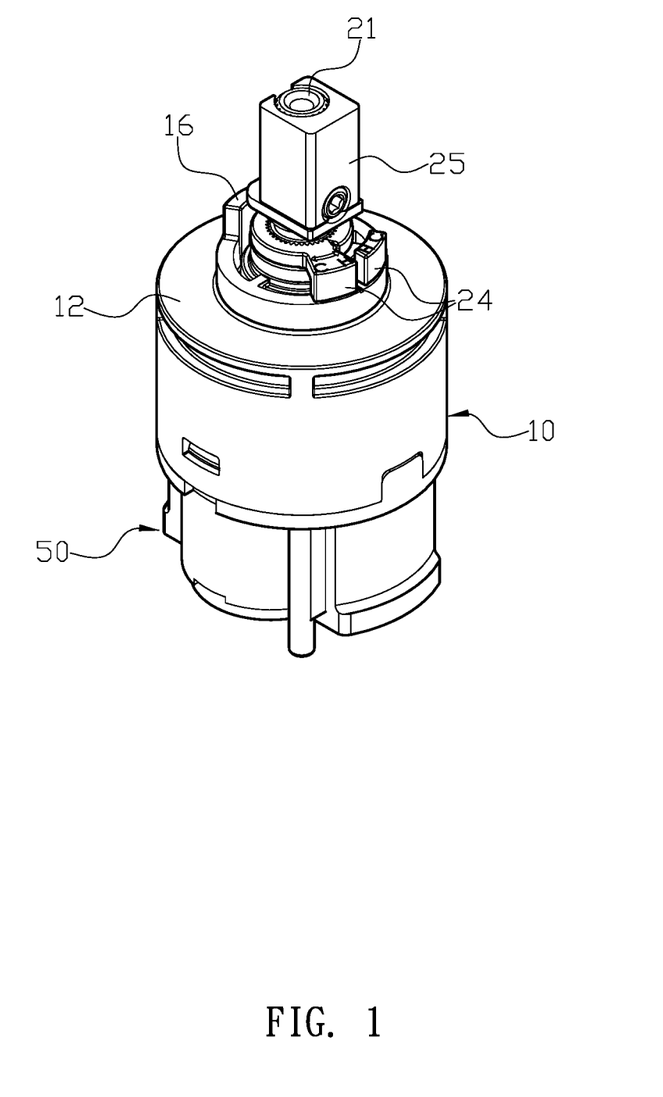
FIG. 1 is a three-dimensional assembly view of a water valve of the present invention.
Figure 2:
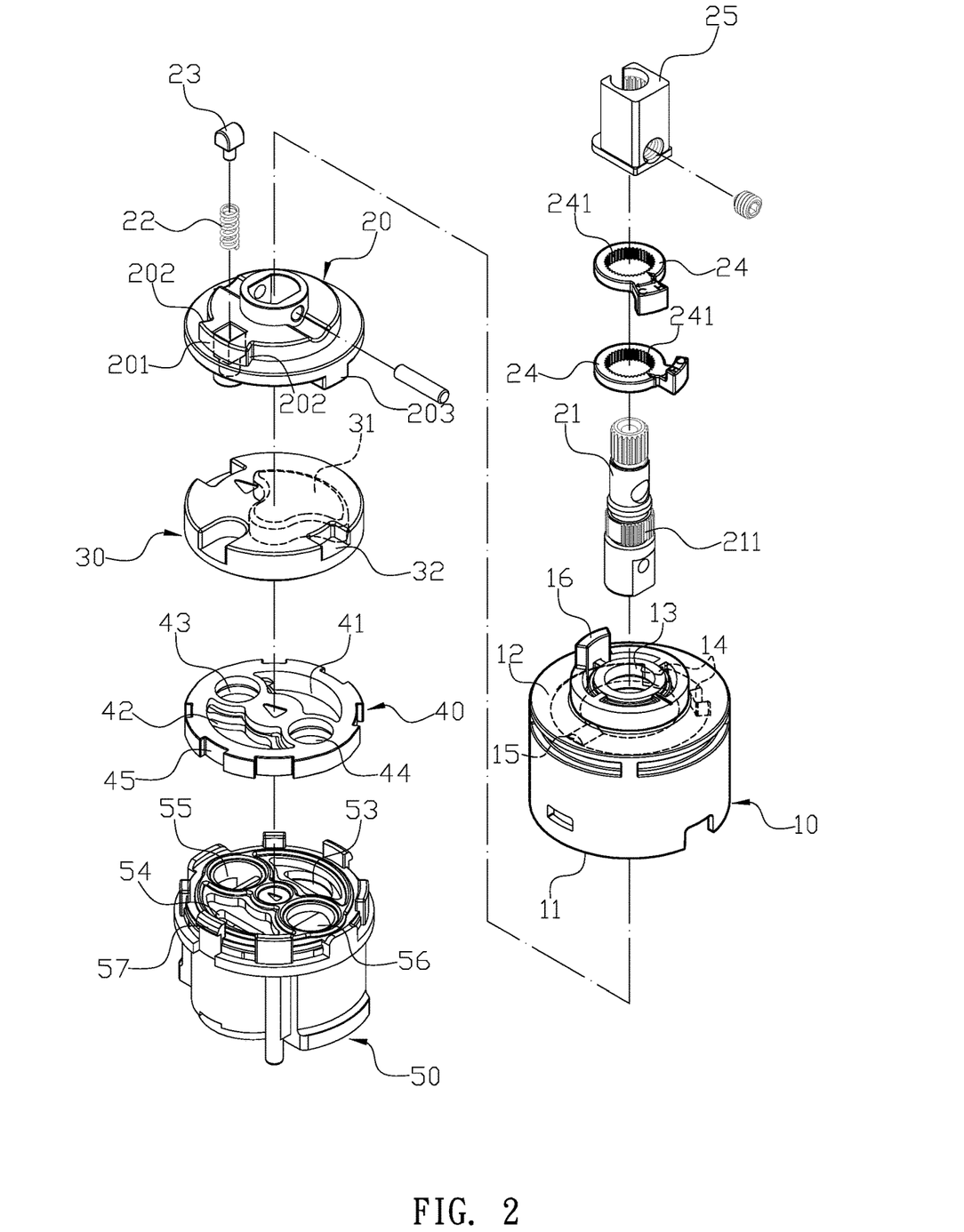
FIG. 2 is a three-dimensional exploded view of the water valve of the present invention.
Figure 3:
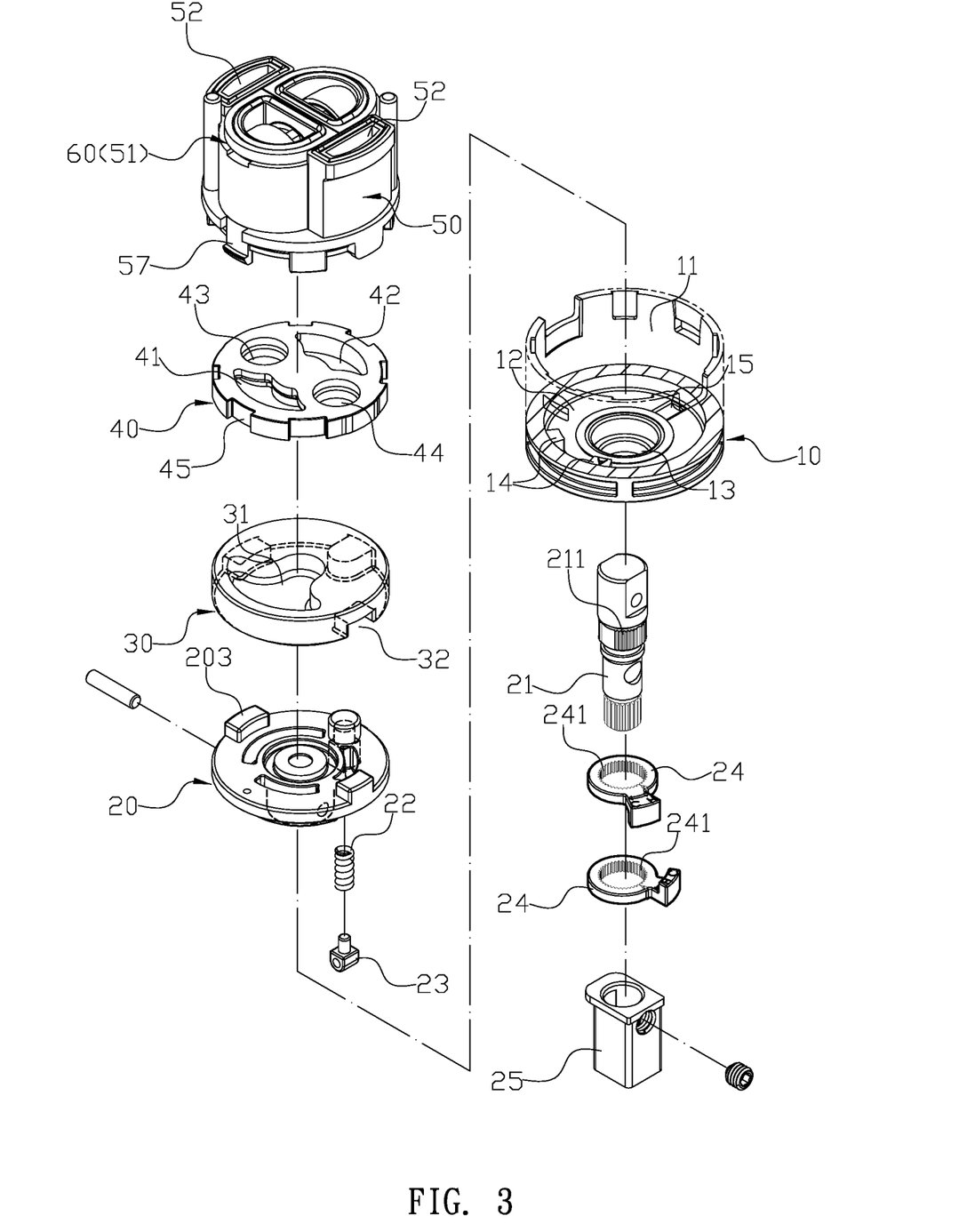
FIG. 3 is a three-dimensional exploded view from another angle of the water valve of the present invention.
Figure 4:
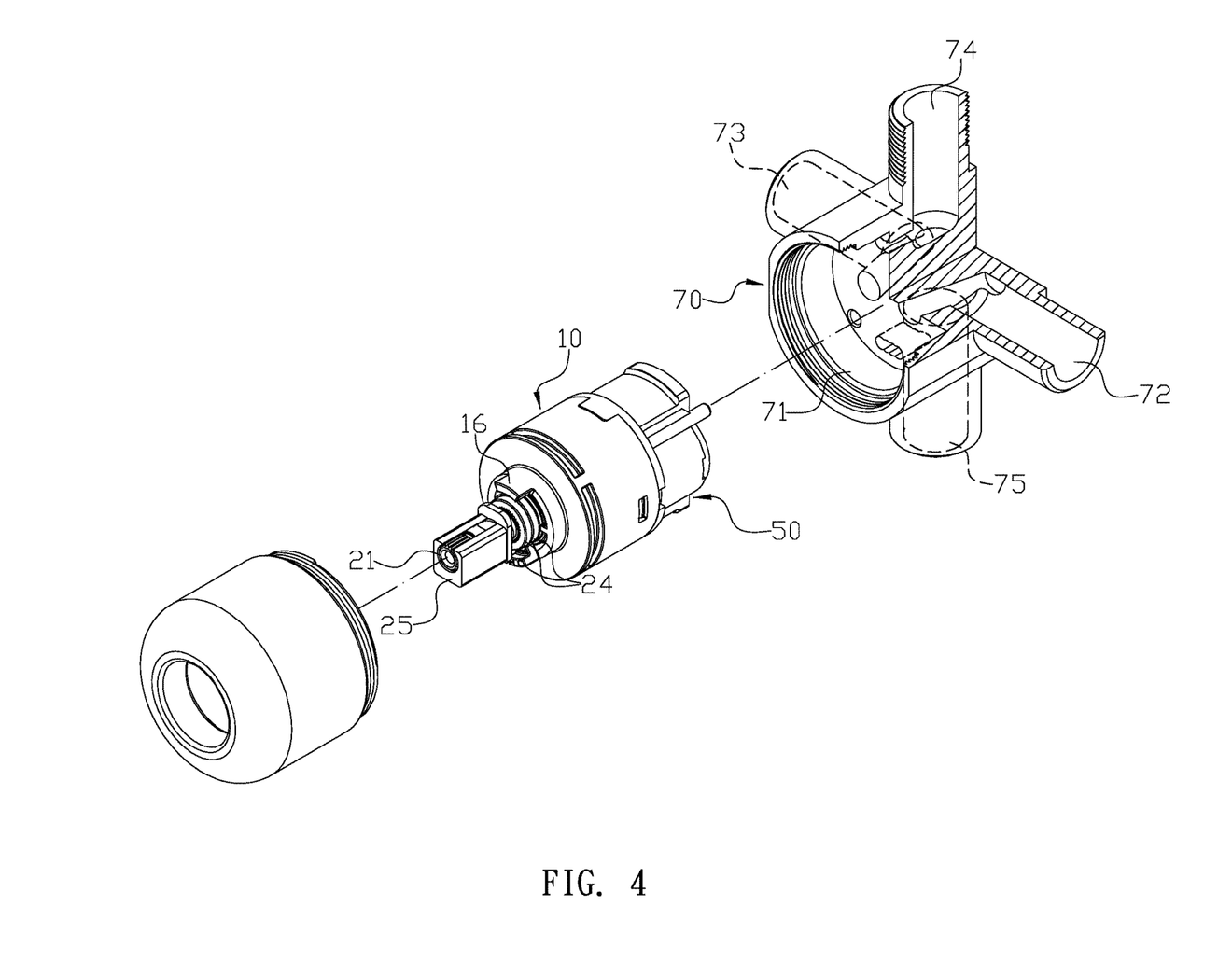
FIG. 4 is a schematic view illustrating the water valve of the present invention is installed in a shunt valve.

In one embodiment, an adapter (25) is connected to the valve rod (21) such that through the adapter (25), the valve rod (21) is configured to connect to different types of handles, and the adapter (25) is adapted to limit the positions of the limiting pieces (24) on the valve rod (21).

In another embodiment, at least a second driving block (203) protrudes from a bottom surface of the rotating base (20), and a top surface of the driving valve piece (30) comprises a recess portion (32) which is configured to engage with the second driving block (203) when the rotating base (20) is coupled with the driving valve piece (30) in the housing (11).

In still another embodiment, a plurality of engaging slots (45) are formed on an outer periphery of the fixed valve piece (40), and a plurality of engaging pieces (57) upwardly protrude from an upper edge of the base (50); each of the engaging pieces (57) is adapted to couple and upwardly pass through the engaging slot (45) to hook on the valve shell (10).

In a further embodiment, the shunt valve (70) is a four-way valve.

In still a further embodiment, the shunt valve (70) is embedded in a wall, and a first water channel (74) is connected to a first water equipment and a second water channel (75) is connected to a second water equipment. In one embodiment, the first water equipment is a shower head fixed on the wall, and the second water equipment is a faucet located under the shower head.

Figure 5:
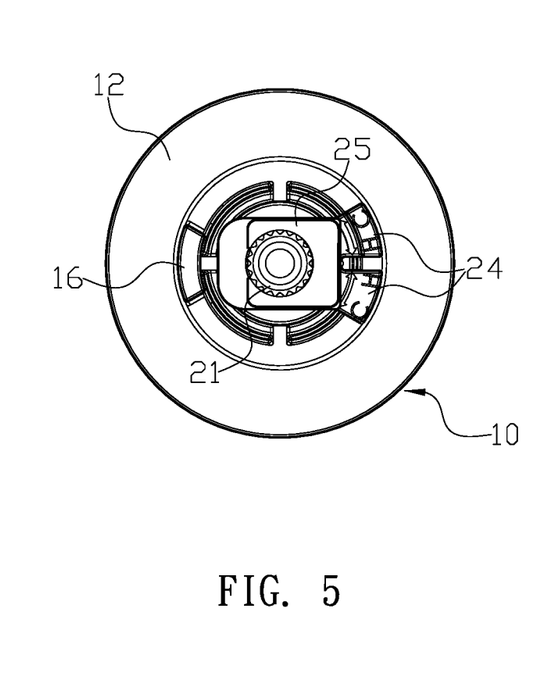
FIG. 5 is a schematic view illustrating a position of a valve rod when the water valve of the present invention is turned off.
Figure 6:
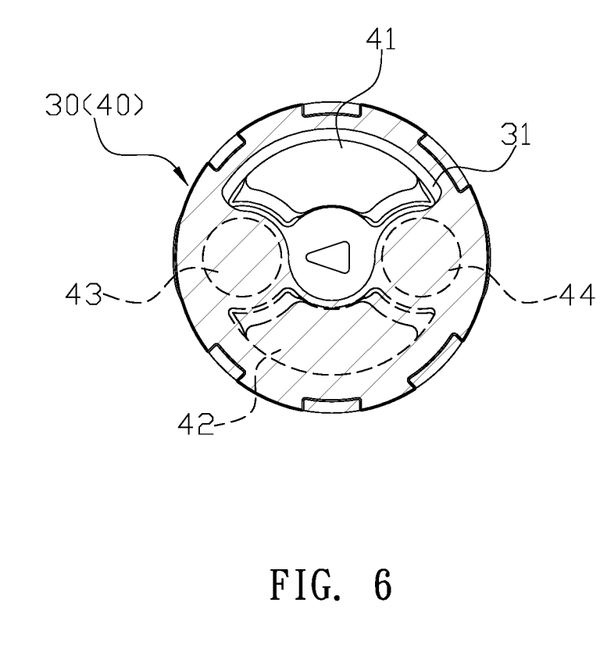
FIG. 6 is a schematic view illustrating a relative position between a driving valve piece and a fixed valve piece when the water valve of the present invention is turned off.
Figure 7:
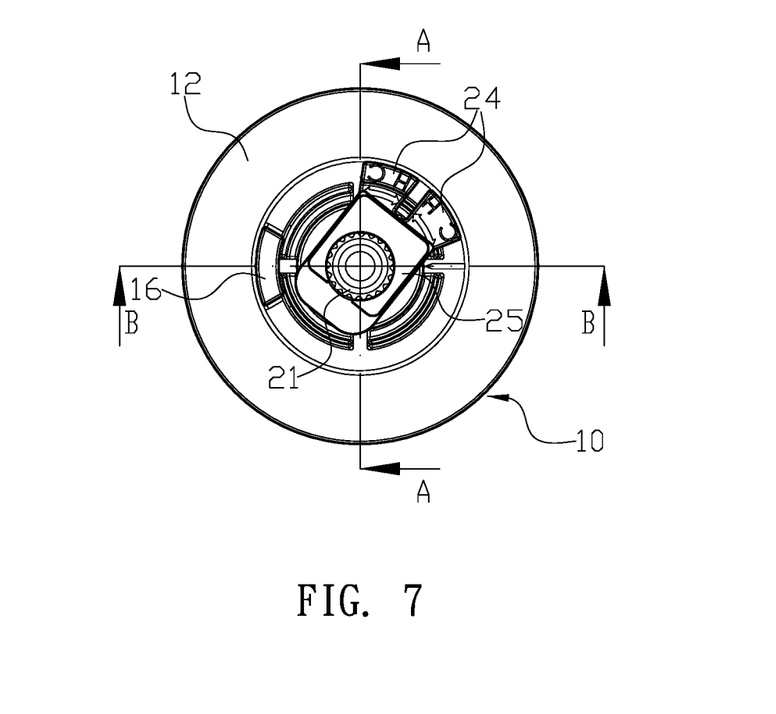
FIG. 7 is a schematic view illustrating a position of the valve rod when cold water is provided from a single water equipment through the water valve of the present invention.
Figure 8:
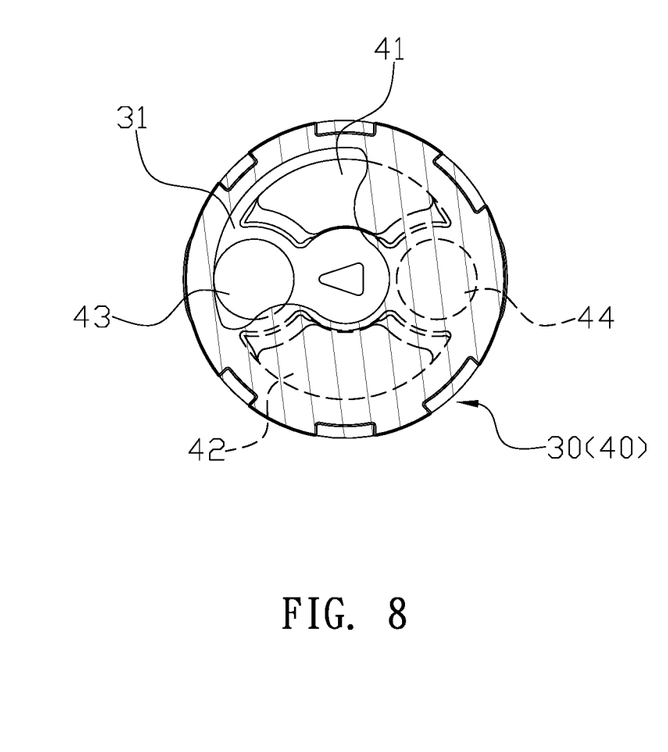
FIG. 8 is a schematic view illustrating a relative position between the driving valve piece and the fixed valve piece when cold water is provided from the single water equipment through the water valve of the present invention.
Figure 9:
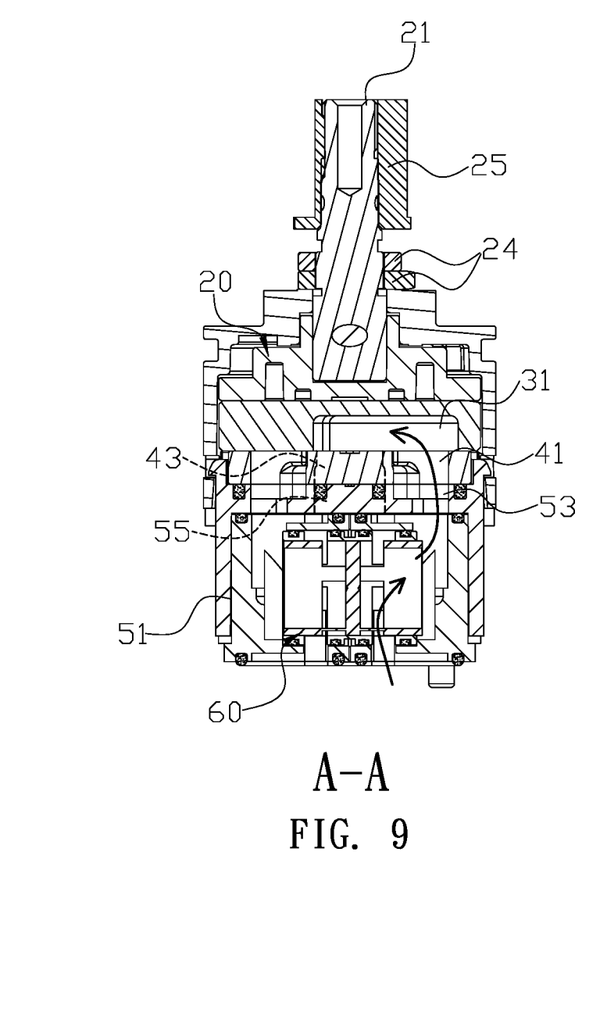
FIG. 9 is a sectional view of FIG. 7 along line A-A.
Figure 10:
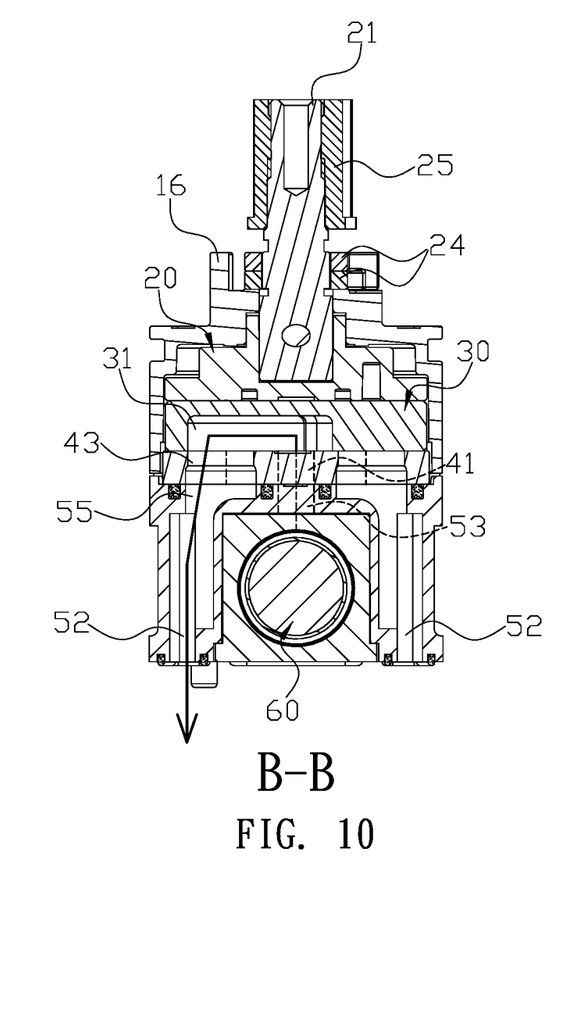
FIG. 10 is a sectional view of FIG. 7 along line B-B.

In actual application, the water valve of the present invention is installed in the valve chamber (71) of the shunt valve (70) and is connected to a handle through the valve rod (21). Through operating the handle, a user can select one of the two water equipments for use through the shunt valve (70), and also can adjust mixing ratio of hot water and cold water when using. When the handle is not operated, the locating bolt (23) borne against by the spring (22) is configured to couple in the locating portion (15) as an initial position. Meanwhile, the mixing chamber (31) of the driving valve piece (30) is adapted to misalign with the hot water hole (42), the first water outlet hole (43), and the second water outlet hole (44) of the fixed valve piece (40) so as to block cold water and hot water from passing through, thereby turning off both of the two water equipments (as shown in FIGS. 5 and 6).

Figure 11:
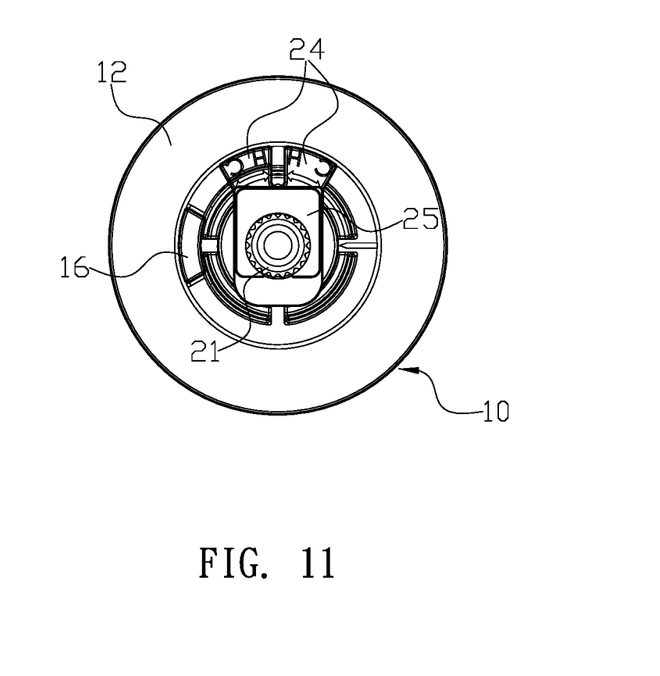
FIG. 11 is a schematic view illustrating a position of the valve rod when warm water mixed from cold water and hot water is provided from a single water equipment through the water valve of the present invention.
Figure 12:
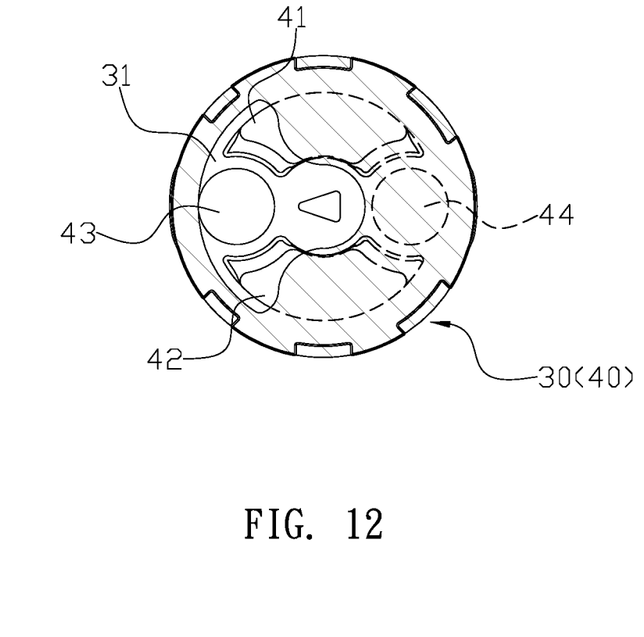
FIG. 12 is a schematic view illustrating a relative position between the driving valve piece and the fixed valve piece when warm water mixed from cold water and hot water is provided from the single water equipment through the water valve of the present invention.
Figure 13:
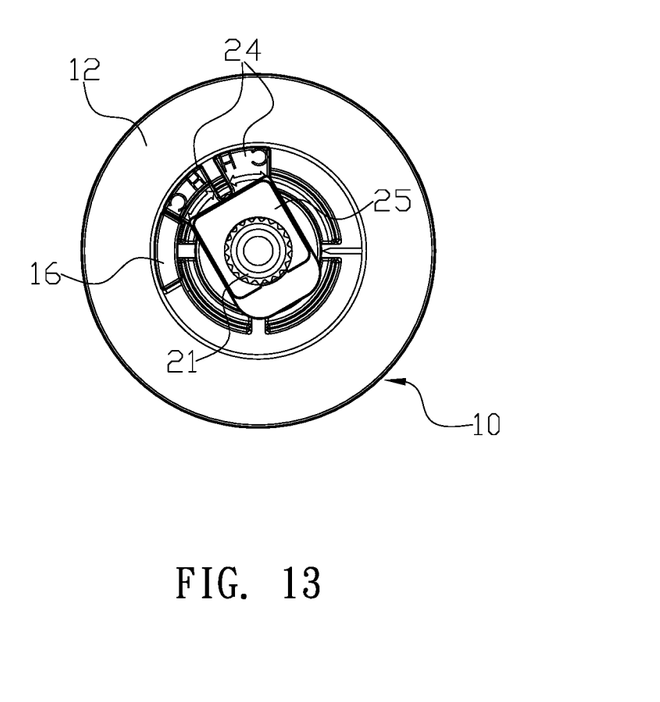
FIG. 13 is a schematic view illustrating a position of the valve rod when hot water is provided from a single water equipment through the water valve of the present invention.
Figure 14:
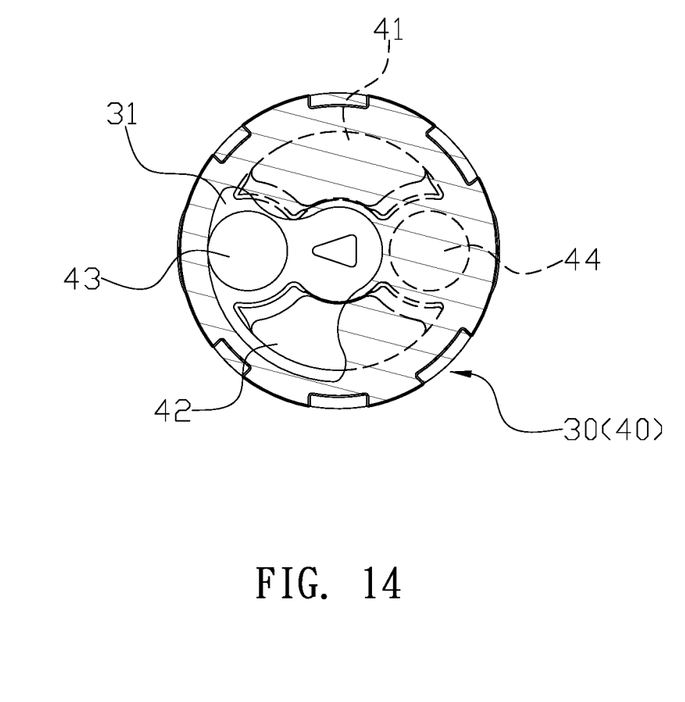
FIG. 14 is a schematic view illustrating a relative position between the driving valve piece and the fixed valve piece when hot water is provided from the single water equipment through the water valve of the present invention.
Figure 15:
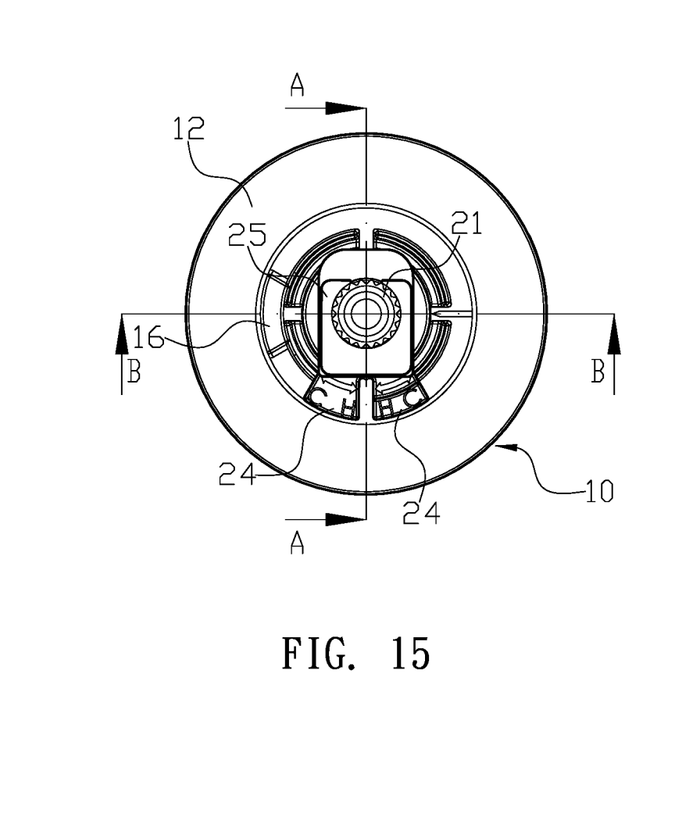
FIG. 15 is a schematic view illustrating a position of the valve rod when warn water mixed from cold water and hot water is provided from the other water equipment through the water valve of the present invention.
Figure 16:
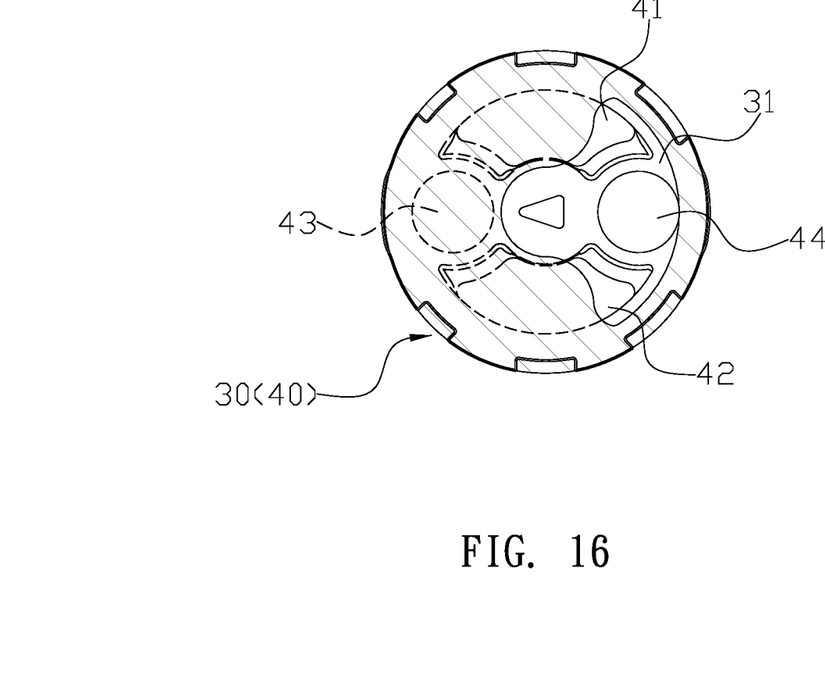
FIG. 16 is a schematic view illustrating a relative position between the driving valve piece and the fixed valve piece when warn water mixed from cold water and hot water is provided from the other water equipment through the water valve of the present invention.
Figure 17:
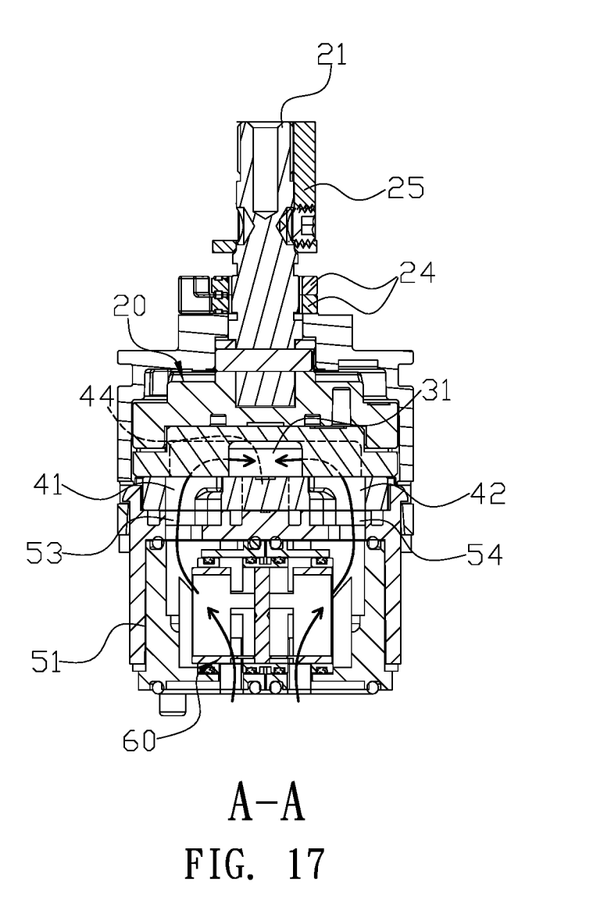
FIG. 17 is a sectional view of FIG. 15 along line A-A.
Figure 18:
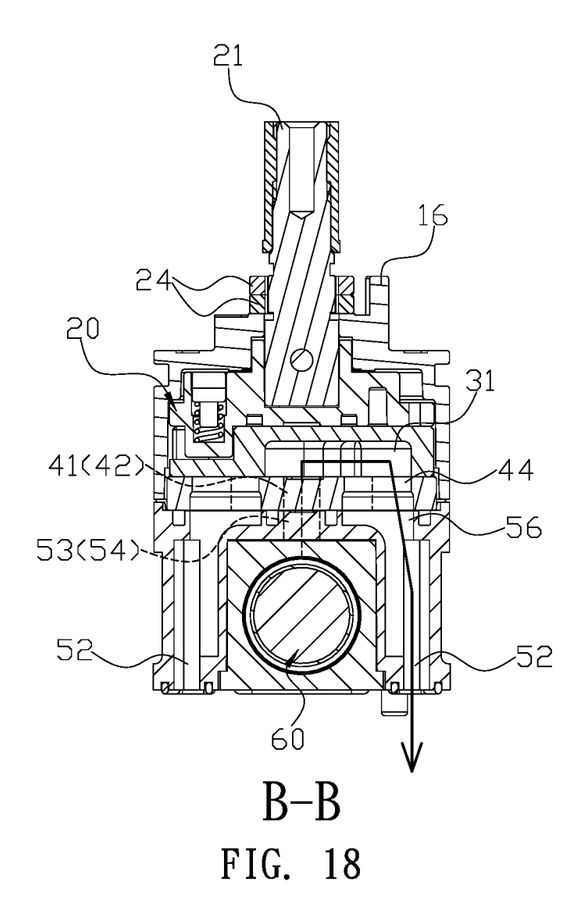
FIG. 18 is a sectional view of FIG. 15 along line B-B.

When one of the two water equipments is used, a user can turn the handle in a first direction, and the valve rod (21) is configured to rotate the rotating base (20), and the rotating base (20) is adapted to drive the driving valve piece (30) to have synchronous rotation, and the mixing chamber (31) is configured to align with the cold water hole (41) and the first water outlet hole (43) such that cold water can flow through the second cold water inlet (72), balanced valve (60), the first cold water inlet (53), the cold water hole (41) to the mixing chamber (31), and then flow through the first water outlet hole (43), the first drain (55), one of the water outlet chamber (52), the first water channel (74) of the shunt valve (70) to one of the water equipment (as shown in FIGS. 7 to 10). Also, the mixing chamber (31) is misaligned with the second water outlet hole (44) such that cold water and hot water will not pass through the second water outlet hole (44), and the shunt valve (70) to the other water equipment. For one water equipment, when warm water or hot water is needed, the user can turn the handle in the first direction further such that the mixing chamber (31) is configured to gradually align with the hot water hole (42), and when the mixing chamber (31) is aligned with the cold water hole (41), the first water outlet hole (43) and the hot water hole (42) (as shown in FIGS. 11 and 12), cold water and hot water are mixed to form warm water for use. When the handle is turned further to the maximum travel position, the mixing chamber (31) is completely misaligned with the cold water hole (41) and only aligned with the first water outlet hole (43) and the hot water hole (42) (as shown in FIGS. 13 and 14), and hot water is provided. The water valve of the present invention is turned off when the handle is turned back to the initial position, and the locating bolt (23) pushed by the spring (22) is configured to re-engage into the locating portion (15).

Figure 19:
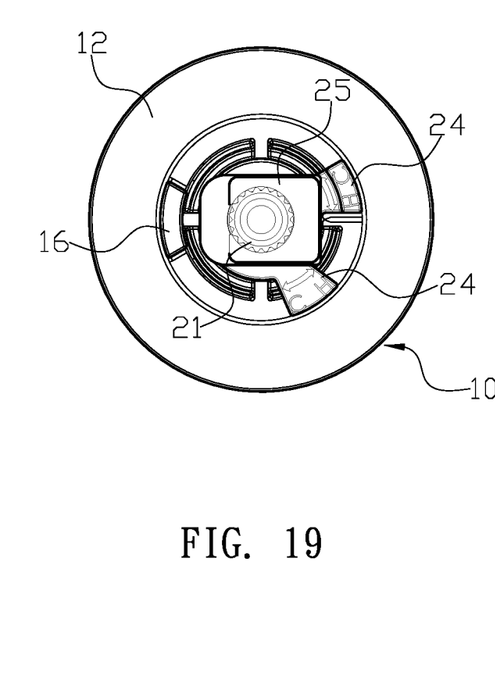
FIG. 19 is a schematic view illustrating positions of two limiting pieces are adjusted.
Figure 20:
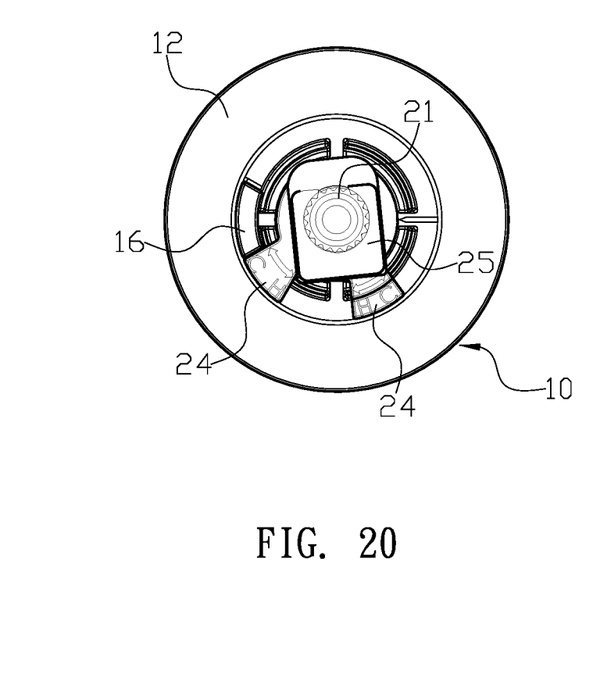
FIG. 20 is a schematic view illustrating the maximum rotation angle of the water valve of the present invention is limited by the two limiting pieces.

When water needs to be transported to the other water equipment, a user can turn the handle in a reverse direction such that the mixing chamber (31) is configured to align with the cold water hole (41) and the second water outlet hole (44), or to align with the cold water hole (41), the second water outlet hole (44) and the hot water hole (42) (as shown in FIGS. 15 to 18), or to align with the second water outlet hole (44) and the hot water hole (42), so that cold water, warm water mixed from cold water and hot water, or hot water is configured to flow through the second water outlet hole (44), the second drain (56), the second water channel (75) to the other water equipment. When the handle is turned in either direction, each of the blocking walls (202) is configured to be blocked by the protruding block (14) to limit the maximum travel distance of the handle so as to prevent the valve rod (21), the rotating base (20), and the driving valve piece (30) are over-rotated. Moreover, one of the two limiting pieces (24) is configured to couple against one end of the locating piece (16) when the valve rod (21) is rotated in either direction, thereby preventing hot water from being suddenly turned on to maximum and causing burns. Furthermore, a user can make adjustment to the maximum temperature of hot water by adjust the separated angle between the two blocking portions of the two limiting pieces (24) (as shown in FIGS. 19 and 20).

Comparing with conventional water valve, the present invention is advantageous because: (i) the water valve of the present invention can control two water equipments in mixing cold water and hot water without installing a water divider between pipes of the water valve or a pulling handle, which simplifies the whole water pipeline and eliminate risk of touching the pulling handle by mistake when in use; (ii) a user can operate single handle of the water valve toward two opposed directions to control the two water equipments for use of water, which saves labor and time; and (iii) the cooperation between the protruding blocks (14), the first driving block (201), the locating piece (16), and the limiting pieces (24) can prevent the water valve from being over-rotated or prevent a user from burns due to hot water draining out instantly, thereby achieving multiple protective effects.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A water valve comprising, a valve shell, and a rotating base installed in the valve shell; a lower end of the rotating base sequentially connected to a driving valve piece and a fixed valve piece, and the driving valve piece and the fixed valve piece installed in the valve shell; a center of a top portion of the rotating base comprising a valve rod upwardly protruding out of the valve shell; the rotating base configured to engage with the driving valve piece, and through operating the valve rod, the rotating base, which is driven by the valve rod, adapted to drive and have synchronous rotation with the driving valve piece so as to change the relative positions between the driving valve piece and the fixed valve piece and then to control on/off operation of a faucet, ratio of hot water and cold water and the amount of water flow; a base coupled with and block a bottom portion of the valve shell, thereby securing the fixed valve piece, the driving valve piece, and the rotating base in the valve shell; the base comprising a water inlet chamber, and a balanced valve installed therein; when in use, the water valve positioned into a valve chamber of a shunt valve, and the shunt valve comprising a second cold water inlet, a second hot water inlet, a first water channel and a second water channel respectively penetrating through a bottom portion of the valve chamber; the second cold water inlet and the second hot water inlet respectively connected to cold water source and hot water source, and the first water channel and the second water channel respectively connected to two water equipments, so that through operating the water valve, cold water, hot water, or warm water mixed from cold water and hot water configured to flow through one of the water equipments;

wherein the valve shell comprises a housing, and an upper portion of housing is connected to a ring portion which has a first opening at a central portion thereof; a diameter of the ring portion is smaller than the housing; the rotating base, the driving valve piece, the fixed valve piece are positioned in the housing of the valve shell, and the valve rod is configured to upwardly protrude out of the valve shell through the first opening; an inner surface of the ring portion comprises two protruding blocks, and a concaved locating portion is formed on the inner surface of the ring portion at a rotating path of the two protruding blocks; a locating piece is upwardly extended from an edge of the first opening;

wherein a central portion of the rotating base is connected to the valve rod, and a first driving block having an arc-edge protrudes from an edge of the rotating base, and two blocking walls are respectively formed at two lateral sides of the first driving block; a slot is formed on an upper surface of the first driving block, and a spring is installed therein; a locating bolt is downwardly coupled with the slot to bear against the spring such that the spring is configured to keep pushing the locating bolt upwardly; a first teeth portion is formed at an outer periphery of the valve rod, and the first teeth portion has two limiting pieces; each of the limiting pieces has a second opening at a central portion thereof, and a second teeth portion is formed at an inner periphery of the second opening; the limiting pieces are disposed and engaged with the valve rod through engaging the second teeth portions with the first teeth portion; each of the limiting pieces comprises a blocking portion, and the limiting pieces are configured to be pulled out from and re-engaged with the valve rod to adjust the separated angle between the two blocking portions, thereby adjusting of temperature limit angle of the water valve;

wherein a bottom portion of the driving valve piece comprises a concave portion to form a mixing chamber, and the mixing chamber is expanded from one side thereof to increase the area of the mixing chamber;

wherein the fixed valve piece comprises an arc-shaped cold water hole and an arc-shaped hot water hole respectively and vertically penetrating through the fixed valve piece, and the cold water hole and the hot water hole are formed symmetrically on the fixed valve piece; a first water outlet hole and a second water outlet hole respectively and vertically penetrate through the fixed valve piece between the cold water hole and the hot water hole, and the first water outlet hole and the second water outlet hole are spaced apart toward opposed sides of the fixed valve piece; and wherein the base has the water inlet chamber and a water outlet chamber formed therein, and the water inlet chamber and the water outlet chamber are formed separately; a first cold water inlet and a first hot water inlet, which are formed separately, are connected at an upper end of the water inlet chamber and vertically penetrate the base; two water outlet chambers are formed at two sides of the water inlet chamber, and the two water outlet chambers are respectively connected to a first drain and a second drain at upper ends thereof, and the first drain and the second drain respectively vertically penetrate through the base; the rotating base, the driving valve piece and the fixed valve piece in the housing are stacked in sequence, and the base is connected to the valve shell, the rotating base, the driving valve piece and the fixed valve piece are secured in the housing, and the fixed valve piece is engaged with an upper portion of the base; the first cold water inlet, the first hot water inlet, the first drain, and the second drain of the base are respectively aligned with the cold water hole, the hot water hole, the first water outlet hole, and the second water outlet hole of the fixed valve piece; before the valve rod is operated, the mixing chamber of the driving valve piece is misaligned with the hot water hole, the first water outlet hole, and the second water outlet hole of the fixed valve piece such that cold water and hot water are blocked by the driving valve piece and not flow out from the shunt valve; when the water valve is positioned into the valve chamber of the shunt valve, the second cold water inlet, the second hot water inlet, the first water channel, and the second water channel of the shunt valve are configured to communicate with the first cold water inlet, the first hot water inlet, the first drain, the second drain of the base respectively.

2. The water valve of claim 1, wherein a detachable adapter is connected to the valve rod.

3. The water valve of claim 1, wherein at least a second driving block protrudes from a bottom surface of the rotating base, and a top surface of the driving valve piece comprises a recess portion which is configured to engage with the second driving block when the rotating base is coupled with the driving valve piece in the housing.

4. The water valve of claim 1, wherein a plurality of engaging slots are formed on an outer periphery of the fixed valve piece, and a plurality of engaging pieces upwardly protrude from an upper edge of the base; each of the engaging pieces is adapted to couple and upwardly pass through the engaging slot to hook on the valve shell.

5. The water valve of claim 1, wherein the shunt valve is a four-way valve.

6. The water valve of claim 1, wherein the shunt valve is embedded in a wall, and a first water channel is connected to one water equipment and a second water channel is connected to the other water equipment.

7. The water valve of claim 6, wherein the two water equipments are respectively a faucet and a shower head.

\* \* \* \* \*